United States Patent [19]

Valette

[11] Patent Number: 5,271,801
[45] Date of Patent: Dec. 21, 1993

[54] PROCESS OF PRODUCTION OF INTEGRATED OPTICAL COMPONENTS

[75] Inventor: Serge Valette, Grenoble, France

[73] Assignee: Commissariat a l'Energie Atomique, Paris, France

[21] Appl. No.: 982,122

[22] Filed: Nov. 25, 1992

Related U.S. Application Data

[63] Continuation of Ser. No. 726,267, Jul. 5, 1991, abandoned.

[30] Foreign Application Priority Data

Jul. 9, 1990 [FR] France .................. 90 08689

[51] Int. Cl.⁵ .............. H01L 21/306; B44C 1/22; C03C 15/00; C23F 1/00
[52] U.S. Cl. .................. 156/643; 156/647; 156/657; 156/662
[58] Field of Search .......... 156/643, 646, 647, 650, 156/653, 651, 655, 657, 659.1, 662, 663, 668; 359/34, 151, 188

[56] References Cited

U.S. PATENT DOCUMENTS 5,032,220 7/1991 Yamamoto et al. .......... 156/656 X

FOREIGN PATENT DOCUMENTS 0367675 5/1990 European Pat. Off. .
59-220703 12/1984 Japan .
60-129711 7/1985 Japan .

OTHER PUBLICATIONS

"Optical waveguides fabricated by preferential etching", Applied Optics, vol. 14, No. 5, May, 1975, pp. 1200–1206, Won-Tieng Tsang et al.

Primary Examiner—William A. Powell
Attorney, Agent, or Firm—Oblon, Spivak, McClelland, Maier & Neustadt

[57] ABSTRACT

The invention relates to a process of production of integrated optical components on a substrate making it possible to combine microguides, separating plates, lenses, diopters. The process consists, for this purpose, in producing a first mask having patterns of given shapes and sizes; performing an anisotropic etching of the substrate not protected by the mask to obtain cavities (20) with vertical walls; eliminating the mask; performing a thermal oxidation of the vertical walls to constitute barrier layers (31) and the mask being used for the etching of the main phase, then in producing a mask (12) having patterns of given shapes and sizes; performing an etching of the substrate not protected by the mask to obtain at least one cavity (13) of desired shape; performing a thermal oxidation to form a peripheral layer (15, 16a, 16, 16c) of given thickness on a part or over the entire inside surface of the cavities; performing a filling (17, 18) of the cavities by a suitable material.

35 Claims, 2 Drawing Sheets

PROCESS OF PRODUCTION OF INTEGRATED OPTICAL COMPONENTS

This application is a continuation of application Ser. No. 07/726,267, filed on Jul. 5, 1991, now abandoned.

DESCRIPTION

This invention relates to a process of production of integrated optical components. It applies in particular to the production of monomode and multimode integrated circuits.

The known processes of production of integrated optical components cannot be used to produce multimode integrated optical components. Actually, the production of multimode integrated optical components making connections with multimode optical fibers possible is a matter of complex and costly techniques.

The difficulties of producing such components result from their dimensions and constraints linked to optics. The dimensions of the components are typically several hundred microns to be compatible with the spaces brought into play in the multimode fibers.

The quality of the interfaces should be compatible with the short wavelength optical use, for which the defects and the irregularities should be less than 0.1 micron.

The verticality of some etchings should be very good on the dimension of the component, i.e., several hundred microns.

To solve these problems, German research workers have proposed the LIGA process which brings into play an x-ray lithography, the only process capable of making possible the etching of micron sized dimensions with depths of focus of several hundred microns.

Such a process is described in the document IEEE of Nov. 9, 1987, titled "Micro Robots and Teleoperators Workshop."

This technique is very cumbersome and as a result is not compatible with objectives of mass production and cost for such applications as in automobiles or dwellings.

DESCRIPTION OF THE INVENTION

This invention has as its object a process making it possible to solve these problems.

The invention therefore relates to a process of production of integrated optical components on a substrate making it possible to combine microguides, separating plates, lenses, diopters, characterized in that it comprises a preliminary phase making it possible to produce the mirrors, the separating plates, the lenses, the diopters, this phase comprising the following stages:
producing a first mask (13) having patterns of given shapes and sizes,
performing an anisotropic etching of the substrate not protected by the mask to obtain cavities (20) with vertical walls,
eliminating the mask,
performing a thermal oxidation of the vertical walls to constitute barrier layers (31) and the mask used for the etching of the main phase,
and characterized in that it comprises a main phase comprising a stage of production of a mask having patterns of given shapes and sizes, a stage of etching of the substrate not protected by the mask, to obtain one or more cavity or cavities of desired shape, a stage of thermal oxidation to form a peripheral layer of given thickness on a part or on the entire inside cavity surface, and a stage of filling of the cavity by a suitable material. The etching is preferably a dry etching for the production of microguides.

This main phase can also comprise a last stage consisting in performing the deposition of an upper protective layer.

The production of the mask consists in performing a thermal oxidation of the substrate at high or at low pressure, according to the desired thickness of the layer, and in making openings in the oxidized layer defining the desired pattern.

The stage of etching of the main phase consists, for example, in performing an isotropic ion etching making it possible to obtain cavities of depth L, the patterns of the mask being selected to have a small width D relative to this depth L, to obtain cavities of virtually circular cross section.

By way of example, D will be selected between 10 and 30 microns so that the dry etching can be performed and L can then vary from 50 to 500 microns, the depth/width ratio having to be at least equal to 5.

To obtain cavities of rectangular cross section, the etching stage will consist in performing an anisotropic ion etching or a preferred chemical etching.

For the production of components of the microguide type, the stage of filling cavities will consist in introducing material with index of refraction ng greater than that of the inside peripheral layer of the cavities.

The introduced material which will constitute the core of the microguide is, for example, a material of the same type as those used in the production of plastic optical fibers. It is possible to select, for example, a polystyrene or PMMA. It is also possible to select optically transparent materials.

For the production of other types of components, for example, reflecting mirrors or separating plates, the stage of filling cavities consists in using a material with index of refraction nr less than that of the inside peripheral layer of the cavities.

The anisotropic etching is obtained by preferred chemical etching or by dry etching of the substrate to a depth L'.

Preferably, the depth of cavities with vertical walls is greater than depth L of the cavities of the microguide.

The stage of thermal oxidation, which makes it possible to obtain barrier layers in the preliminary phase, makes it possible at the same time to produce the mask which will make it possible to perform the etching for the production of the microguide.

The thermal oxidation intended to form the peripheral layer of the cavities can be produced under high pressure, to have a sufficient thickness which will give a good solidity to the walls. In this case, the fact of leaving the cavities filled with air will make it possible to work in the vicinity of the total reflection, i.e., with an angle of incidence greater than the arc sine $1/n_1$, $n_1$ being the index of the core of the microguides.

For an angle i of any value, a metal deposit with an aluminum, gold, silver base can be made by evaporation or cathode sputtering at incidence.

It is also possible to perform a thermal oxidation under low pressure, but then it will be preferable to fill the cavities of the mirrors with metal with a low melting temperature (aluminum, silver,— indium), to strengthen the walls.

For the production of separating plates, the cavities forming these plates can be filled with a dielectric material with an index of refraction different from that of the core of the microguides.

BRIEF DESCRIPTION OF THE DRAWINGS

Other characteristics and advantages of the invention will be more evident from the following description, given by way of nonlimiting illustration, which is made with reference to the accompanying drawings in which:

FIGS. 2A and 2B represent the stage of formation of a peripheral layer inside the cavities, FIGS. 3A and 3B represent the stage of filling cavities from suitable materials, FIGS. 4A and 4B represent the stage of covering cavities by a protective layer, FIG. 5 diagrammatically represents the stages of the preliminary phase according to the process according to the invention, FIG. 6 diagrammatically represents a card comprising microguide type components combined with mirrors obtained by the process according to the invention.

FIGS. 1 to 4 represent the various stages of production of integrated optical components according to the process according to the invention.

FIG. 1A shows a section of a substrate 10 surmounted by a mask 12. The mask made it possible to perform an etching of the substrate at unprotected locations, to obtain a cavity 13 whose cross section is approximately circular. For this purpose, the mask exhibits openings whose width D is small enough relative to desired depth L of the cavity and the etching is isotropic of chemical or preferably dry type. In the case of a dry etching, it will involve an etching with controlled geometry, produced, for example, from a gas mixture $SF_6$ and $O_2$ in a microwave type reactor.

FIG. 1B diagrammatically represents the stage of production of a cavity with rectangular cross section in a substrate 10 surmounted by a mask 12. The mask makes it possible to perform an etching of the substrate at unprotected locations. The cavity exhibits walls 14a and 14b, which are nearly vertical. Depth L of the cavity will generally be smaller than that obtained in the case of FIG. 1A and the etching will be an anisotropic etching of chemical or dry type.

In these figures, substrate 10 of monocrystalline silicon is seen on which a mask 12, equipped with patterns of suitable shapes and sizes to make possible the etching of this substrate, has been produced to form cavities inside the substrate. Mask 12 has been obtained by thermal oxidation of the silicon made under a pressure and a temperature selected to form a silica layer of sufficient thickness.

Openings are made in silica layer 12 according to the pattern to be produced on a selected width D. These openings are made by the standard photoengraving techniques.

In the case of an isotropic etching, the cavities obtained have a circular cross section shape, width D being selected, for this purpose, between 10 and 13 microns, this width being small enough while making it possible to make this etching. Depth L varies between 50 and 500 microns. The larger depth L is relative to this width D, the more the cross section approximates that of a circle and therefore is perfectly compatible with the cross sections of the cores of the optical fibers.

In the case of the anisotropic dry etching of the substrate, which makes it possible to obtain rectangular cross sections with very vertical walls, depth L is generally smaller.

Figure 1:
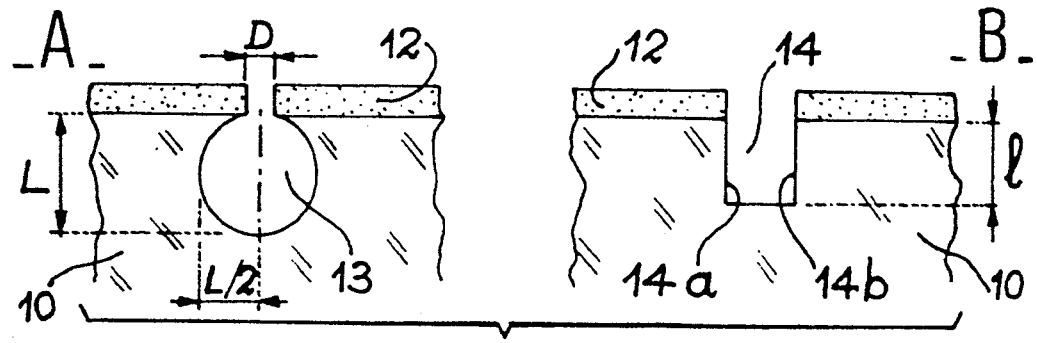
FIG. 1 represents the stage of production of cavities in the substrate, according to the invention, FIG. 1A relating to the formation of a microguide, FIG. 1B relating to the formation of a mirror or a separating plate.
Figure 2:
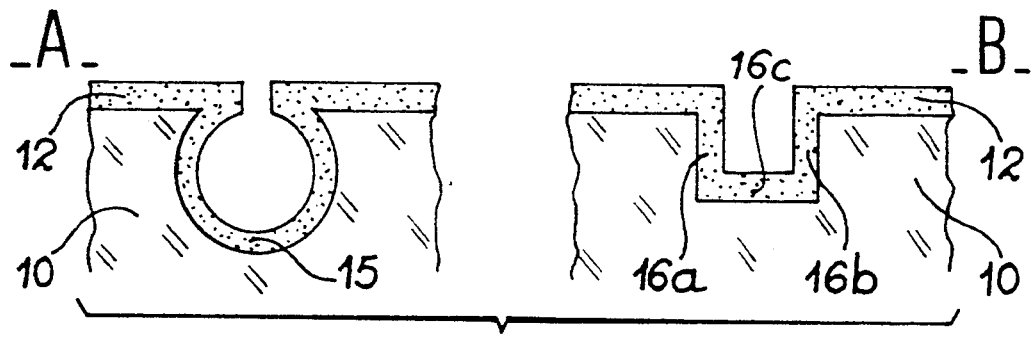

After having produced mask 12 then and etching of substrate 10 to obtain cavities, the process consists in performing a thermal oxidation of the silicon to form a peripheral layer of given thickness on a part or on the entire inside surface of the cavities (mask 12 being able to be eliminated or maintained). In FIG. 2A, the thermal oxidation is performed over the entire inside surface of the cavity and forms a silica layer 15 which will subsequently constitute the cladding of the microguide produced.

In FIG. 2B, the thermal oxidation of the silicon makes it possible to obtain a peripheral layer on vertical walls 14a, 14b, and on the bottom of the cavity, this layer bearing references 16a, 16b, 16c.

The thermal oxidation can occur under standard pressure to obtain small silica thicknesses going from 1 to 3 microns, or under high pressure (between 10 and 20 bars) to obtain much higher silica thicknesses going from 5 to 20 microns. Preferably, a choice will be made to perform this thermal oxidation under high pressure and under temperatures located between 800° C. and 1100° C. to obtain a thickness of 5 to 10 microns.

After this stage of thermal oxidation, a stage of filling cavities by a suitable material is performed.

Figure 3:
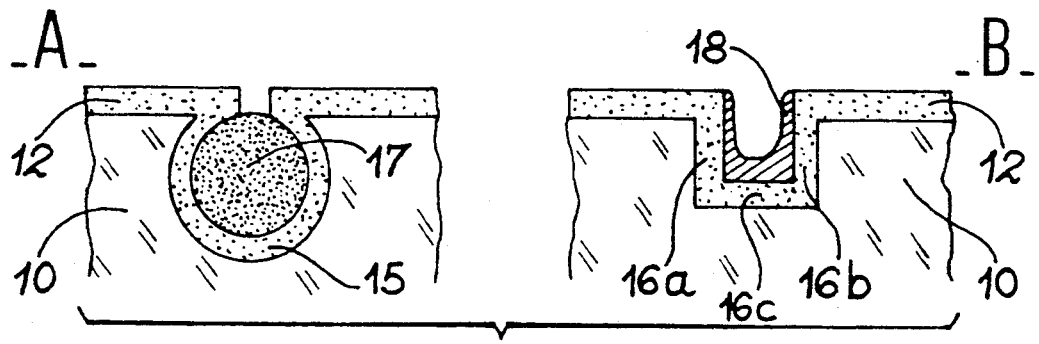

In FIG. 3A, cavity 13 was filled with a material with an index of refraction greater than that of layer 15. It is possible to select, for example, a material used in the production of PMMA plastic fibers with an index of refraction equal to 1.49 or a polystyrene with an index of refraction equal to 1.55. These materials being liquid beyond about 150° C., it is therefore easy to inject them and then to await their cooling, and thus to obtain a region 17 which will form the core of the microguide, as represented in FIG. 3A.

In practice, any material which is transparent for the working wavelengths and with a greater index than that of the silica can be suitable. A thermosetting or hardenable glue in ultraviolet radiation can be suitable.

In the case of FIG. 3B, if the thermal oxidation having led to the formation of peripheral layer 16a, 16b and 16c has been made under high pressure, the thickness of this layer going from 10 to 20 microns is enough for the solidity. It is possible in this case to leave the cavity filled with air. The filling material being the air, the reflection will be total with an index angle i greater than arc sine $1/n_1$, $n_1$ being the index of the core of the microguide which can be combined with the mirror thus formed. It is also possible to fill the cavity by deposition of a layer 18, which will correspond to a metallization in the case of the production of a mirror with reflection which is not total.

A last stage, which is not essential, can consist in performing the deposition of a protective layer (superstrate) on the cavities which have been produced by the process according to the invention. It is therefore possible at this stage, to perform a low-temperature redeposition of silica or a material with low index to close the cavities. It will thus be possible to use an optical glue or a silica gel.

Figure 4:
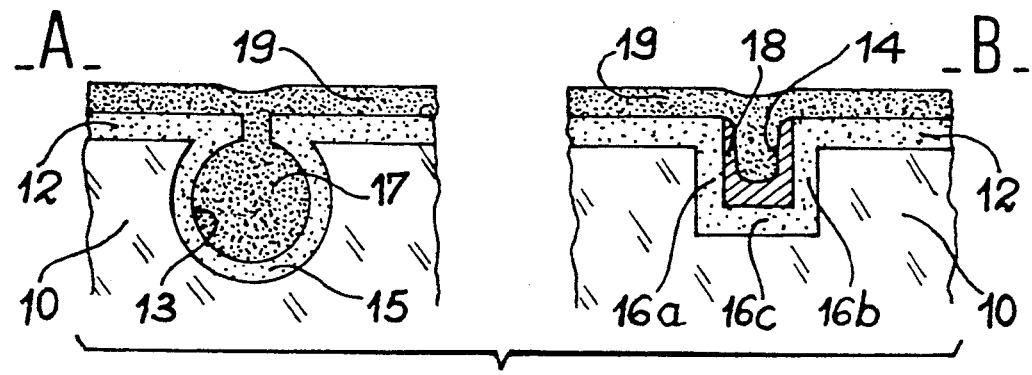

This layer, which has been represented in FIGS. 4A and 4B, bears reference 19.

The process according to the invention also makes it possible to produce such components as microguides combined with other types of components, in particular with mirrors and/or separating plates on the same card.

For this purpose, the process will advantageously comprise a preliminary phase making it possible to produce cavities intended to form separating plates and/or mirrors, and the main phase which will make it possible to produce the microguides and to accomplish the production of mirrors and/or the separating plates from cavities obtained during the preliminary phase.

Figure 5:
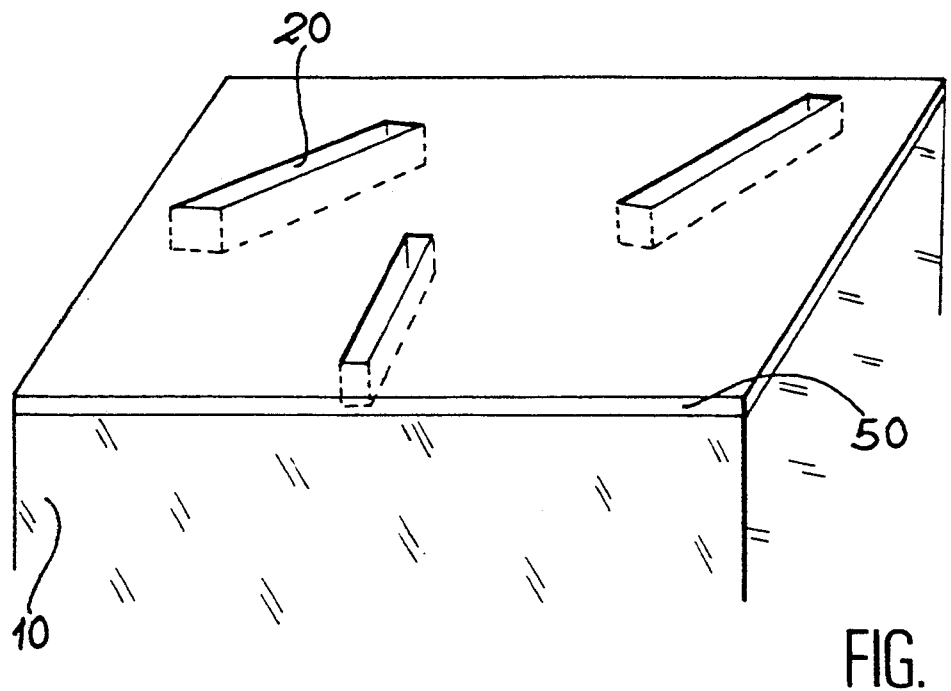

In FIG. 5, a substrate 10, seen in perspective, in which the various types of components which were just set forth will be formed, has been represented.

Substrate 10 of monocrystalline silicon is surmounted by a layer 13 producing a first mask comprising patterns of given shapes and sizes corresponding to the lengths and the widths of mirrors or separating plates that are desired to be obtained.

This mask is obtained by deposition of a material making possible an etching, preferably $Si_3N_4$ will be used (silica or a metal can also be used).

Then, an etching of this $Si_3N_4$ layer will be performed according to patterns 20 whose two sides are selected parallel to the line of the barrier planes which will later be used during the isotropic etching made to produce the cavities forming the microguides and which will preferably be a dry etching.

A preferably anisotropic etching, which is performed in a standard way by bringing into play basic etching agents with an alcohol as a moderator (KOH + ethanol or methanol, diethylamine + alcohol), is then performed, this preferred etching will be performed to a depth L' greater than L, L being the depth of the cavities forming the microguides.

The elimination of the silicon nitride, i.e. the layer which formed the mask, will then be performed. If the etching is dry anisotropic, the same operation will be performed, but without any constraint of following crystalline planes. The dry etching will then, for example, be performed by microwave etching with SF6 type gas for a silica mask.

After this preliminary stage, various stages constituting the main phase will be used, on the one hand, to form the cavities intended to produce the microguides and, on the other hand, to finish the production of mirrors and/or separating plates.

For this purpose, the production of a second mask is performed by thermal oxidation of the substrate. This stage will make it possible to create a barrier layer for the dry etching, which will be made to form the cavities of the microguides. It is also possible to use this stage of thermal oxidation of the substrate to form a mask intended for this dry etching of the substrate during the formation of the cavities used to produce the microguides.

If the mask is not produced during this stage, it can be produced independently by deposition or thermal oxidation.

Figure 6:
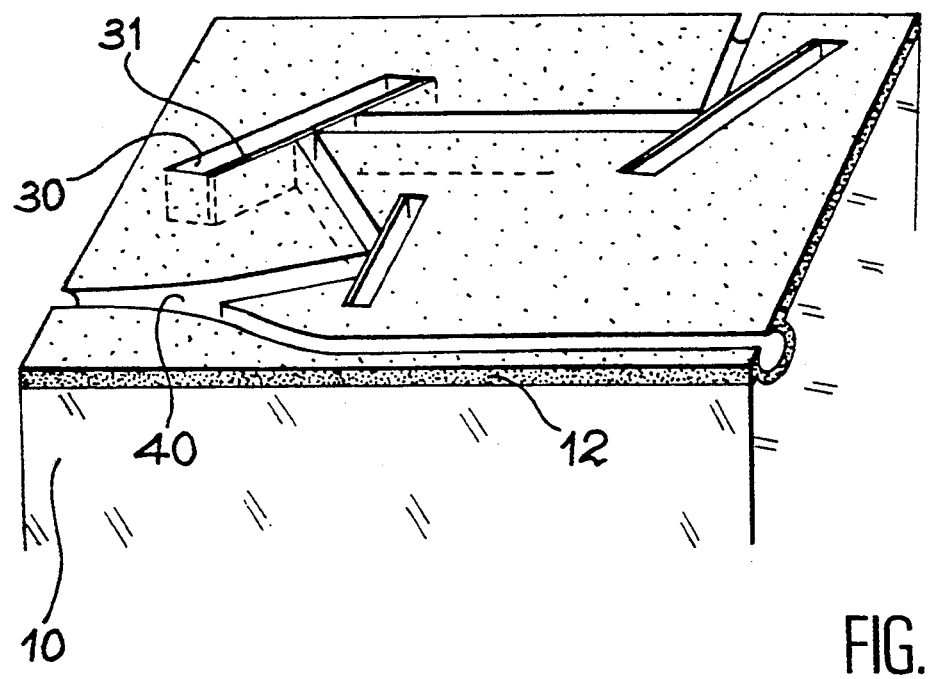

FIG. 6 represents the diagram of the card in which the microguides combined with mirrors are produced. This diagram makes it possible to illustrate more particularly the stage of production of the components relating to the isotropic etching made to produce cavities 40 which will make it possible to form the microguides. Vertical walls 31, which are barrier planes in the isotropic etching of the cavities of the microguides, are also represented in this diagram. The isotropic etching of microguides 40 has been performed, as has already been stated, from mask 12, which was formed by thermal oxidation of the substrate, under the conditions set forth above.

Cavities 30 forming the mirrors can be filled with air, and, in this case, a total reflection will be obtained with an angle of incidence i greater than arc sine $1/n_1$, $n_1$ being the index of the core of the microguide. It is also possible to make a metal deposition of aluminum, chromium, gold or silver, by evaporation or cathode sputtering at incidence. Angle of incidence i can then be of any type. It is also possible to fill these cavities with metal with a low melting temperature, for example, aluminum, silver, indium, to strengthen the wall, but, of course, this variant embodiment can be applied only for the cavities which will form mirrors and not separating plates.

In the case of separating plates, the cavities can be filled by a dielectric with an index which is quite different from that of the core of the microguide (for example, the optical glue).

In conclusion:

the cavities produced for the microguides can be obtained either by an isotropic etching or by an anisotropic etching, these two types of etchings able to be both chemical and dry; advantageously, these cavities are produced by a dry isotropic etching, the cavities produced for the other components (separating plates, mirrors, lenses, diopters...) are obtained by an anisotropic etching which can be dry or chemical, the mirrors, in the case of the total reflection, are produced either by using air in the cavity covered by $SiO_2$ or by using a metal layer 18, the mirrors, in the case of the reflection which is not total, are produced by necessarily using a metal layer 18 and optionally a protective layer 19, in these last two cases, the cavities used for the mirrors are obtained preferably either by a chemical anisotropic etching to have plane walls or by a dry anisotropic etching to have nonplane, for example parabolic or elliptical, walls, the separating plates are produced during conditions of total reflection either by using air or a dielectric with an index of refraction different from that of the core of the associated microguide; in the case of using a dielectric, it is also possible to use a protective layer 19, the lenses or the diopters are produced in the same way as the separating plates, but necessarily with use of a dry anisotropic etching to obtain cavities with nonplane (convex or concave) walls with filling with air or dielectric under the same conditions as the separating plates.

I claim:

1. A process for producing integrated optical components on a substrate, comprising the steps of:

producing a first mask on said substrate so that only first regions of the substrate are not covered by the mask;

anisotropically etching said first regions, thereby forming a first cavity having nearly vertical walls;

removing the first mask from the substrate;

thermally oxidizing the vertical walls;

forming a second mask on said substrate so that only second regions of said substrate are not covered by the mask;

etching said second regions, thereby forming a second cavity;

thermally oxidizing a surface region of said second cavity; and filling the first and second cavities with a first material.

2. A process for producing integrated optical components on a substrate, comprising the steps of:

forming a mask on said substrate so that only a selected region of said substrate is not covered by the mask;

etching said selected region, thereby forming a cavity;

thermally oxidizing a surface region of said cavity; and filling the cavity with a first material wherein etching said selected region comprises isotropic ion etching, thereby forming said cavity into a nearly circular cavity in the substrate, said cavity having an opening width at the substrate surface and a depth from the substrate surface, said width being smaller than said depth.

3. A process for producing an integrated optical microguide on a substrate, comprising the steps of:

producing a mask on said substrate;

isotropically etching that portion of the substrate not protected by the mask, to obtain at least one nearly circular cavity inside the substrate;

thermally oxidizing the substrate to form a peripheral layer of given thickness inside the cavity, said peripheral layer forming a cladding of the microguide;

filling the nearly circular cavity with material, said material forming the core of the microguide.

4. A process according to claim 3, wherein the mask has an opening width to define the cavity pattern whose width is smaller than a depth of said cavity.

5. A process according to claim 3, wherein the isotropic etching of the substrate comprises dry isotropic etching.

6. A process according to claim 3, further comprising the step of depositing an upper protective layer on said substrate, after the step of filling.

7. A process according to claim 3, wherein the step of producing a mask comprises:

thermally oxidizing the substrate while the substrate is exposed to a selected gas pressure;

removing the oxide from the substrate on a portion of the substrate corresponding to desired patterns.

8. A process according to claim 4, wherein a ratio of the cavity depth to the opening width of the mask is at least equal to 5.

9. A process according to claim 3, wherein the step of filling the cavity comprises the introducing of a material with an index of refraction ng greater than that of the inner peripheral layer of the cavity, this material constituting the core of the microguide.

10. A process according to claim 9, wherein the material introduced is a material of the same type as those used for the production of plastic optical fibers.

11. A process according to claim 9, wherein the filling material is an optically transparent and hardenable material.

12. A process for producing integrated optical components on a substrate comprising the steps of:

a) producing a first mask;

b) anisotropically etching that portion of the substrate which is not protected by the first mask to obtain at least one first cavity having nearly vertical walls;

c) removing the first mask from the substrate;

d) thermally oxidizing the vertical walls to constitute barrier layers for etching;

e) producing a second mask;

f) performing etching of that portion of the substrate that is not protected by the second mask and the barrier layers, to obtain at least one second cavity of a desired shape;

g) thermally oxidizing the substrate to form a peripheral layer of given thickness inside the second cavity;

h) filling at least the second cavity with a second material.

13. A process according to claim 12, wherein the step of anisotropically etching comprises a preferential chemical etching of the substrate.

14. A process according to claim 12, wherein the depth of the first cavity is greater than the depth of the second cavity.

15. A process according to claim 12, wherein the step e of producing the second mask comprises the steps of:

thermally oxidizing the substrate simultaneously with step d of thermally oxidizing the vertical walls;

removing the oxide from the substrate in a portion corresponding to desired pattern.

16. A process according to claim 12, wherein the steps d and g of thermally oxidizing occur under at least atmospheric pressure.

17. A process according to claim 12, wherein the first and second cavities are filled respectively with a first material and with the second material.

18. A process according to claim 17, wherein the first and second materials are identical.

19. A process according to claim 12, wherein the material filling the first cavity comprises a material with an index of refraction nr which is less than the index of refraction of inner barrier layers of said first cavity.

20. A process according to claim 17, wherein the step of filling the first material in the first cavity consists of vapor deposition of metal to form a mirror.

21. A process according to claim 17, wherein the step of filling the first material in the first cavity for forming a mirror comprises filling said cavity with a low melting point metal.

22. A process according to claim 17, wherein the step of filling the first cavity which is for forming a separating plate on said substrate consists of filling said first cavity with a dielectric material with an index of refraction different from that of the second material filling the second cavity.

23. A process according to claim 12, wherein the etching of the substrate of step f comprises dry etching.

24. A process according to claim 12, further comprising the step of depositing an upper protective layer on said substrate after the step h of filling.

25. A process according to claim 12, wherein the step a of producing the first mask comprises:

thermally oxidizing the substrate while the substrate is exposed to a selected gas pressure;

removing the oxide from the substrate on a portion corresponding to a desired pattern.

26. A process according to claim 23, wherein the step of dry etching comprises isotropic ion etching thereby forming nearly circular cavities.

27. A process according to claim 26, wherein the nearly circular cavities have an opening width at the substrate surface and a depth from said surface, said opening width being smaller than said depth.

28. A process according to claim 26, wherein a ratio of the cavity depth to the opening width of the mask is at least equal to 5.

29. A process to claim 12, wherein the step b comprises anisotropic ion etching making it possible to obtain cavities with rectangular cross section.

30. A process according to claim 12, wherein the step h of filling the second cavity comprises introducing the second material with index of refraction ng greater than that of the inner peripheral layer of the cavity, the second material constituting the core of the microguide.

31. A process according to claim 30, wherein the second material is of the same type as those used for the production of plastic optical fibers.

32. A process according to claim 30, wherein the second material is an optically transparent and hardenable.

33. A process according to claim 12, wherein said components comprises microguides.

34. A process according to claim 12, wherein the components comprise at least one member selected from the group consisting of mirrors, separating plates, lenses and diopters.

35. A process according to claim 12, wherein the components comprise at least two members selected from the group consisting of microguides, mirrors, separating plates, lenses and diopters.

* * * * *